United States Patent [19]

Blessing

[11] Patent Number: 5,024,634
[45] Date of Patent: Jun. 18, 1991

[54] HYDRAULIC VARIABLE LOCK DIFFERENTIAL WITH OIL RETURN IN FLOATING MANIFOLD

[75] Inventor: Martin G. Blessing, Fort Wayne, Ind.

[73] Assignee: Dana Corporation, Toledo, Ohio

[21] Appl. No.: 515,644

[22] Filed: Apr. 23, 1990

Related U.S. Application Data

[63] Continuation of Ser. No. 241,596, Sep. 8, 1988, abandoned.

[51] Int. Cl.$^5$ .............................................. F16H 1/44
[52] U.S. Cl. ...................................... 475/86; 475/249
[58] Field of Search .................. 475/86, 88, 150, 226, 475/249; 192/85 R

[56] References Cited

U.S. PATENT DOCUMENTS

| | | | |
|---|---|---|---|
| 2,580,381 | 1/1952 | Banker | 74/710.5 |
| 2,965,181 | 12/1960 | Senkowski | 74/710.5 |
| 3,138,970 | 6/1964 | Costa et al. | 74/711 |
| 3,343,429 | 9/1967 | Frost | 74/711 |
| 3,748,928 | 7/1973 | Shiber | 74/711 |
| 3,814,222 | 6/1974 | Koivun | 192/4 A |
| 3,895,547 | 7/1975 | Yamaguchi et al. | 74/695 |
| 3,923,133 | 12/1975 | Chivari | 192/85 R |
| 4,041,804 | 8/1977 | Clark | 475/88 |
| 4,298,085 | 11/1981 | Moroto et al. | 475/86 X |
| 4,373,622 | 2/1983 | Michael | 192/85 R |
| 4,389,908 | 7/1983 | Dudek | 74/711 |
| 4,412,459 | 11/1983 | Goscenski, Jr. | 74/711 |
| 4,627,513 | 12/1986 | Tutzer | 180/249 |
| 4,718,302 | 1/1988 | Nussbaumer et al. | 74/710.5 |
| 4,781,078 | 11/1988 | Blessing et al. | 475/150 |
| 4,862,768 | 9/1989 | Iwatuki et al. | 475/86 |

FOREIGN PATENT DOCUMENTS

| | | | |
|---|---|---|---|
| 600138 | 6/1960 | Canada | 475/86 |
| 0192950 | 8/1986 | Japan | 74/711 |

OTHER PUBLICATIONS

F. McFarland and E. L. Nash, *Nonspinning Differential Gives Increased Traction*, SAE Transactions, p. 19, Jan. 1957, U.S.A.
R. P. Lewis and L. J. O'Brien, *Limited Slip Differentials*, SAE Transactions, pp. 203-212, vol. 67, 1959, USA.
Author unknown, *Focus on Controllable-Slip Differentials*, Automobile Internal, pp. 23-27, Jul. 1974, USA.
Author unknown, *ARB Air Locker*, ARB Sales Literature, 4 pages, published on or before Mar. 9, 1988, USA.

*Primary Examiner*—Allan D. Herrmann
*Assistant Examiner*—Khoi Q. Ta
*Attorney, Agent, or Firm*—Marshall & Melhorn

[57] ABSTRACT

A vehicle differential includes a clutch assembly and a hydraulic actuator for selectively preventing relative rotation between a pair of vehicle half axles. The differential assembly has an outer housing rotatably mounting a gear case and ring gear therein. A planetary gear assembly is coupled between the gear case and one half axle. The planetary gear assembly is also coupled to a sun gear which in turn is coupled to the other half axle. The clutch assembly is coupled between the gear case and the sun gear. An annular manifold is fixedly mounted in the outer housing and sealingly engages an outer surface of the gear case for supplying pressured hydraulic fluid to actuate a piston in a cylinder formed in the gear case which in turn actuates the clutch assembly. The pressure of the hydraulic fluid determines a range of torque differentials for which the clutch assembly will prevent relative rotation between the half axles.

8 Claims, 3 Drawing Sheets

HYDRAULIC VARIABLE LOCK DIFFERENTIAL WITH OIL RETURN IN FLOATING MANIFOLD

This application is a continuation of U.S. patent application Ser. No. 07/241,596, filed Sept. 8, 1988 and now abandoned.

BACKGROUND OF THE INVENTION

The present invention relates in general to a limited slip differential for a vehicle and, in particular, to an hydraulically actuated variable lock differential.

Early differential mechanisms consisted of a set of planetary gears coupled between two half-shafts of a drive axle. Such a drive axle has the advantages over a solid axle that the wheels of the vehicle can travel at different speeds and equal driving force can be applied to the driving wheels. However, under certain conditions, this conventional differential has a serious deficiency. For example, if one drive wheel is on a slippery surface, such as ice or mud, that wheel will slip and spin because its tire can not grip the road. Consequently, the slipping wheel can apply very little driving torque to move the car. The opposite drive wheel, which well may be on a surface that gives good adhesion, can apply no more driving torque than the spinning wheel because the differential delivers only an equal amount of torque to both wheels. Thus, the total driving force can never be more than twice the amount applied by the wheel with the poorest road adhesion.

Traction is also adversely effected, especially during hard driving, by other conditions that unbalance the weight on the driving wheels. When driving at high speed around a curve, the weight is transferred from the inside wheel to the outside wheel. Hard acceleration coming out of a turn can then cause the inside wheel to spin because it has less weight on it and therefore less road adhesion. Similarly, during any hard acceleration there is propeller shaft reaction torque on the rear axle assembly. When one wheel is partially unloaded and looses part of its traction capability, the loss is not offset by gain on the opposite side because the total can only be twice that of the wheel with the lesser capability.

The limited slip differential was designed to improve the traction of a vehicle under adverse traction conditions by allowing the differential to transmit torque to the axle shafts in unequal amounts without interfering with the differential action on turns. The most common limited slip differential is the friction type which has clutch assemblies mounted between the two side gears and the differential case. In a conventional differential, the side gears and the axle shafts to which they are splined always turn freely in the case. The added clutches provide a means of transferring torque from the faster spinning (usually slipping) wheel to the slower spinning (usually better adhesion) wheel.

Typically, there are two clutch packs, each of which is comprised of disks that are splined to the side gear, and plates that are tanged to fit into the differential case. Thus, the disks rotate with the side gear and the plates rotate with the case. The clutches are applied or actuated by two forces. One force is applied by springs compressed between the two side gears which push the side gears apart, towards the case, and thus keep the plates and disks in contact with each other. This force is relatively constant and preloads the clutches. The other force results from the tendency of the pinions and side gears to push themselves apart as they turn. This force is applied through the side gears and increases the pressure on the plates and disks. This force becomes greater as the driving torque transmitted from the pinions to the side gears increases and is therefore a variable force.

The typical limited slip differential has a design limit on the amount of torque transfer from the faster to the slower wheel, so that the torque on the wheel with good traction is about two and one half times that of the wheel with poor traction. From the above description, several shortcomings of the common limited slip differential are apparent:

(1) During turning maneuvers, torque is transferred to the inside wheel at a rate generally proportional to the driving torque. This results in a tendency to understeer.

(2) Under conditions where one driving wheel is on a very slippery surface while the other has good traction, the amount of torque that can be transferred is very limited, essentially determined by the preload spring force on the clutch packs.

It is the intent of this invention to overcome these shortcomings by providing an externally controllable limited slip differential whose clutch actuating force is not dependent on preload springs or side gear separating forces caused by drive line torque, but rather is provided by hydraulic pressure. This pressure may be regulated as necessary to adjust the differential from zero to full locking as driving needs dictate.

SUMMARY OF THE INVENTION

The present invention concerns an hydraulically actuated variable lock differential which utilizes a piston to actuate a multidisk wet clutch to selectively lock the differential. The clutch pack is mounted within a right side differential case half and the clutch disks are alternately splined to a sun gear and the case half. At the left side of the clutch pack, a pressure plate is fitted and held in position by a snap ring. The right side case half also contains an annular cavity which retains a piston. When hydraulic fluid is injected into the cavity, the piston moves axially to the left and squeezes the clutch disks against the pressure plate thereby providing resistance to relative rotation of the left and right output shafts of the differential.

The hydraulic fluid is provided to the piston cavity by means of passages formed in the right case half and leading to an opening on the outer surface of the case half hub. A ring-shaped manifold is fitted external to the case half and suitably mounted so that it does not rotate. This manifold receives hydraulic fluid under pressure from an external supply. The manifold is sealed to the rotating hub by primary and secondary seals so that the fluid will enter opening in the case half hub. A set of passages in the manifold ring allows any hydraulic fluid that leaks past a primary seal to be captured by a secondary seal and returned to the external fluid supply.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
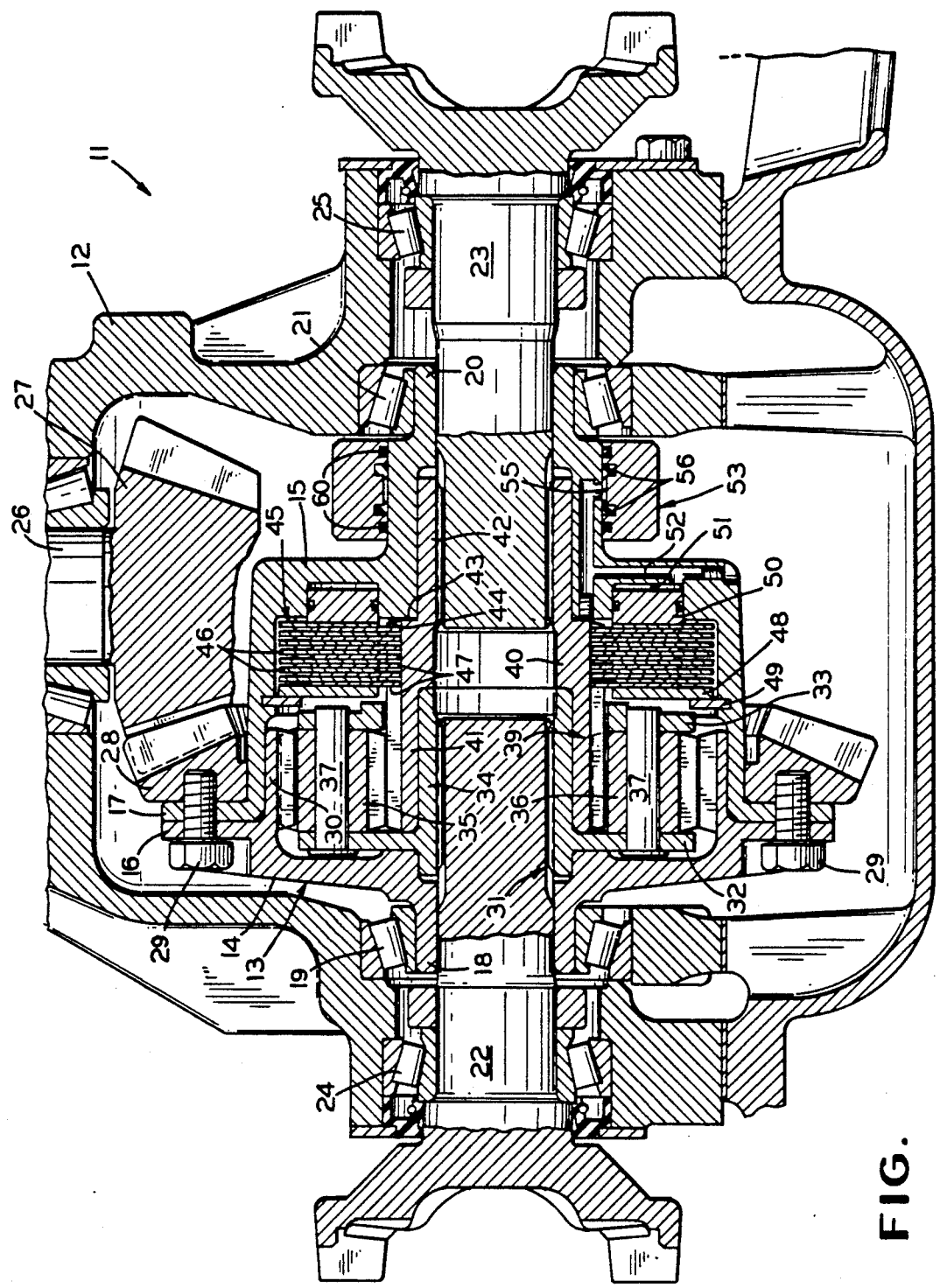
FIG. 1 is a sectional top plan view of a differential assembly incorporating the present invention.

There is shown in FIG. 1 a vehicle differential gear apparatus 11 incorporating an hydraulically actuated variable lock differential mechanism in accordance with the present invention. The apparatus 11 includes an outer housing 12 enclosing a rotatable differential gear case 13. The case 13 is formed from a left half case 14 and a right half case 15 which abut at radially outwardly extending flanges 16 and 17 respectively. The left half case 14 has an axially outwardly extending hub 18 formed thereon which is rotatably retained by a tapered roller bearing 19 mounted on the interior of the outer housing 12. Similarly, the right half case 15 has an outwardly axially extending hub 20 which is rotatably retained by a tapered roller bearing 21 mounted on the interior of the housing 12. The bearings 19 and 21 are mounted on opposite sides of the housing 12 concentrically with a pair of openings through which the inner ends of a left half axle 22 and right half axle 23 respectively extend. The half axles 22 and 23 are rotatably supported by a pair of tapered roller bearings 24 and 25 respectively which are mounted in the openings formed in the outer housing 12.

An end of a drive shaft 26 extends through a front wall of the outer housing 12 and terminates in a drive pinion gear 27. A ring gear 28 is mounted on the outer surface of the right half case 15 and abuts the flange 17. The case halves 14 and 15 are attached together and to the ring gear 28 by a plurality of threaded fasteners 29 which pass through apertures formed in the flanges 16 and 17 and threadably engage threaded apertures in the ring gear 28.

Figure 2:
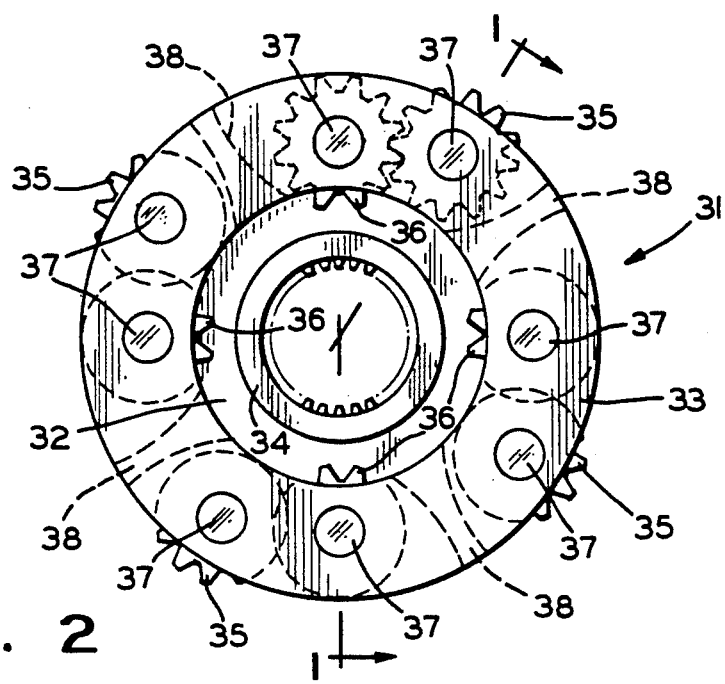
FIG. 2 is a right side elevational view of the planetary gear wheel assembly shown in FIG. 1.

An annular gear 30 is formed at the base of the flange 16 on the left half case 14 and extends inside the right half case 15. The annular gear 30 has a plurality of inwardly facing teeth. The annular gear 30 cooperates with a planetary gear assembly 31 mounted inside the annular gear 30 and coaxial with the left half axle 22. Referring to FIG. 1 and FIG. 2, the planetary gear assembly 31 includes a pair of spaced apart generally circular plates 32 and 33. The left side plate 32 includes a generally tubular hub portion 34 which is coupled to the inner end of the left half axle 22 by cooperating sets of splines. The right plate 33 is formed with an enlarged central opening through which the hub portion 34 extends.

Mounted between the facing inner surfaces of the plates 32 and 33 are a plurality of meshed pairs of planet gears 35 and 36. The planet gears 35 and 36 are each rotatably mounted on an associated one of a plurality of pins 37 which extend through apertures formed in the plates 32 and 33 and are retained by any suitable means, permanent or releasable. A plurality of web members 38 extend radially from the axis of rotation of the plates 32 and 33 and are attached to the inner surfaces of those plates to form a unit. The gear 35 of each pair of gears is positioned closer to the periphery of the gear assembly 31 than the gear 36. The outer gears 35 all mesh with the inwardly extending teeth of the annular gear 30. The inner gears 36 all mesh with radially outwardly extending teeth formed on an exterior of a sun gear 39 as shown in FIG. 1. The gears 35 and 36 shown in FIG. 1 are shown in cross section as if taken along the line 1—1 in FIG. 2.

The sun gear 39 is generally tubular in shape and has a center portion 40. An axially extending left end portion 41 extends over and is rotatably mounted on the hub portion 34 of the left plate 32. The left end portion 41 is externally toothed to engage the planet gears 36. The teeth extend from an outer end of the left end portion 41 which abuts the inner face of the left plate 32 to the right hand edge of the center portion 40. An axially extending right end portion 42 is internally splined to the inner end of the right half axle 23. The outer surface of the right end portion 42 engages an inwardly facing concentric bearing surface formed in the end of the right half case 15. A radially disposed annular shoulder 43 is formed at the junction of the center portion 40 and the right end portion 42. The shoulder 43 bears against a radially extending annular surface 44 formed inside the right half case 15.

An hydraulically operated multidisk wet clutch assembly 45 is positioned inside the right half case 15 concentric with and mounted on the center portion 40 of the sun gear 39. The clutch assembly 45 provides a variably controllable resistance to the relative rotation between the left half axle 22 and the right half axle 23. The clutch assembly 45 includes a wet clutch pack comprised of a plurality of laterally movable annular clutch disks concentrically stacked together side by side. Alternate disks 46 are slidably keyed to the right half case 15 and are linked to the left half axle 22 through the right half case 15, the left half case 14, the annular gear 30 and the planetary gear assembly 31. The alternate disks 46 alternate with a plurality of intermediate disks 47 which are slidably keyed by means of radially inwardly projecting teeth which engage the teeth formed on the center portion 40 of the sun gear 39.

The left end of the clutch pack of the clutch assembly 45 abuts an annular pressure plate 48. The pressure plate 48 is prevented from axial movement to the left by a snap ring 49 which engages an inwardly facing annular groove formed in the interior surface of the right half case 15 adjacent the planetary gear assembly 31. The right end of the wet clutch pack abuts an annular piston 50 retained in an annular piston chamber 51 formed in an interior surface of a wall of the right half case 15 and sealed with 0-rings on its outer and inner diameters. The piston 50 is free to move axially in the piston chamber 51 to apply pressure to the wet clutch pack tending to force it against the pressure plate 48.

The right end of the piston chamber 51 has an orifice formed therein which is in fluid communication with an hydraulic fluid passageway 52 formed in the wall of the right half case 15. The opposite end of the fluid passageway 52 is in fluid communication with an orifice which opens to an external surface of the right half case 15 at an inwardly facing surface of a manifold 53.

Figure 4:
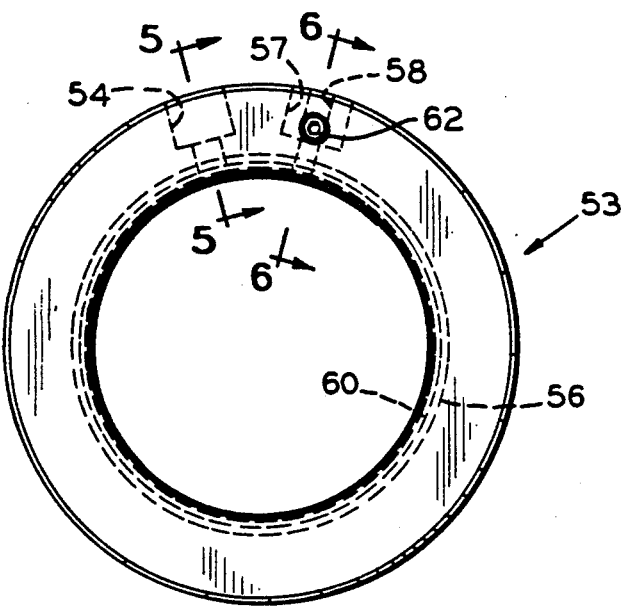
FIG. 4 is a right side elevational view of the hydraulic fluid manifold shown in FIG. 1.
Figure 5:
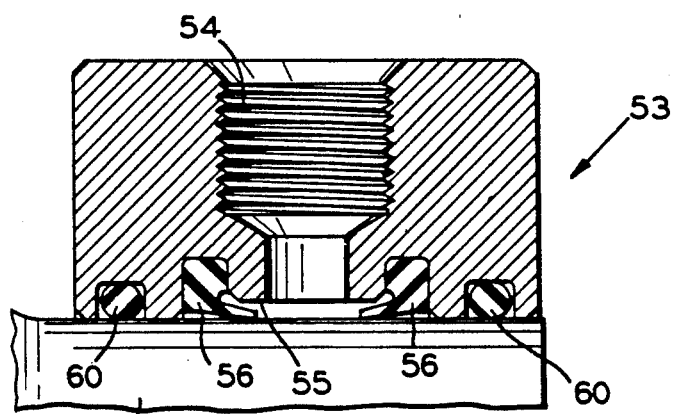
FIG. 5 is an enlarged cross-sectional view of the manifold inlet as if taken along the line 5—5 in FIG. 4.
Figure 6:
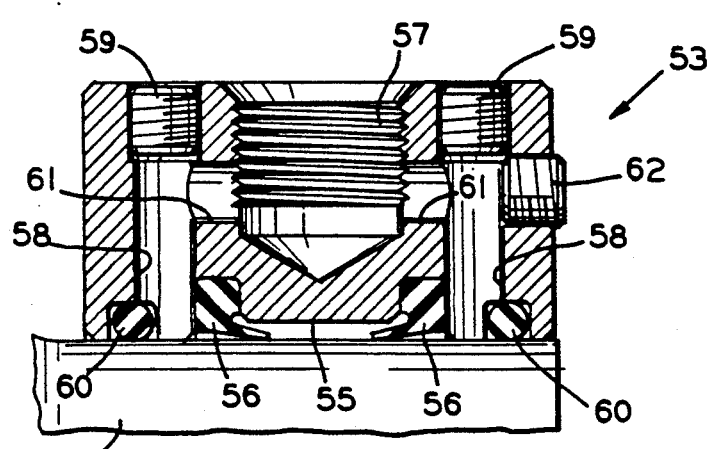
FIG. 6 is an enlarged cross-sectional view of the manifold inlet as if taken along the line 6—6 of FIG. 4.

The manifold 53 is shown in greater detail in FIG. 4 through FIG. 6. The manifold 53 includes a fluid inlet passage 53a, shown in FIG. 5, and a fluid outlet passage 53b, shown in FIG. 6. The manifold 53 has a radially extending threaded inlet 54 formed in an outer surface thereof for connection to an hydraulic fluid supply line and fitting (not shown). The threaded inlet 54 is in fluid communication with an inwardly facing annular channel 55. The channel 55 faces the exterior surface of the right half case 15 and is sealed along opposite sides by a pair of annular lip seals 56. The lip seals 56 form a primary seal for the hydraulic fluid path. If any of the hydraulic fluid should leak past the lip seals 56, it can be returned to the hydraulic fluid supply through a threaded outlet 57 formed in the exterior surface of the manifold 53. The threaded outlet 57 is adapted to be connected to a threaded fitting and hydraulic line (not shown) to return hydraulic fluid to a reservoir as will be discussed below.

The threaded outlet 57 is connected to a pair of radially extending passages 58 spaced between the threaded outlet 57 and the opposite side surfaces of the manifold 53. The passages 58 extend from the outer peripheral surface to the inner peripheral surface of the manifold 53 and are closed at their outer ends by threaded plugs 59. A pair of O-ring (or other suitable) seals 60 are positioned in annular grooves formed in the inner peripheral surface of the manifold 53 and are positioned between the lip seals 56 and the side surfaces of the manifold 53. The lip seals 56 and the O-ring seals 60 are exposed to opposite sides of the inner end of the radial passages 58. Thus, any hydraulic fluid which leaks from the annular channel 55 past the lip seals 56 will enter the passages 58 and will be prevented by the O-ring seal 60 from leaking outside the manifold 53. The threaded outlet 57 is in fluid communication with the radial passages 58 through an axially extending passage 61 extending from one side surface of the manifold 53 to the passage 58 adjacent the opposite side surface. The outer end of the passage 61 is sealed with a threaded plug 62. The manifold 53 can be mounted to the outer housing 12 by any suitable means to prevent rotation. Thus, the right half case 15 rotates within the central opening of the manifold 53 against the lip seals 56 and the O-rings 60. The O-ring seals 60 function as a secondary seal which enables any hydraulic fluid which leaks past the primary seal to be returned to the external hydraulic fluid supply.

Figure 3:
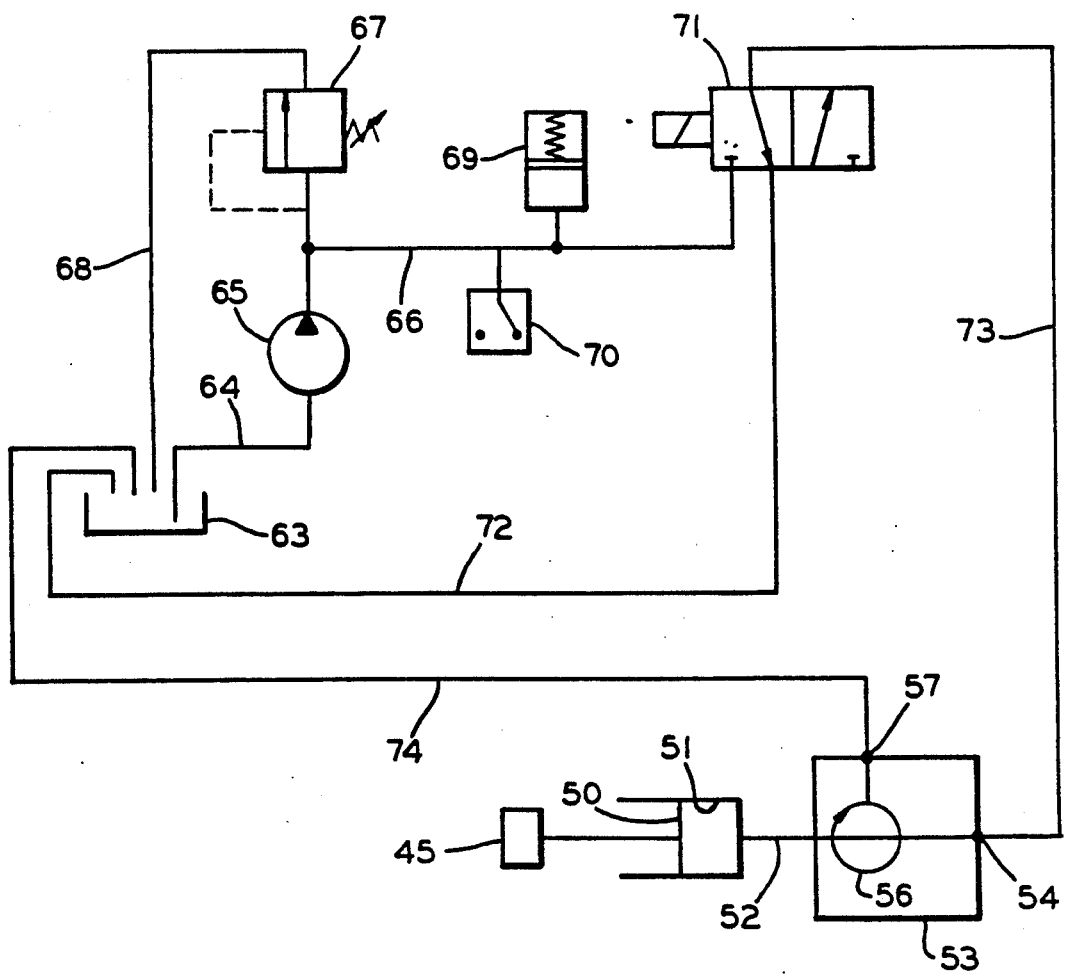
FIG. 3 is a schematic block diagram of the pressured hydraulic fluid supply system for the present invention.

There is shown in FIG. 3 a schematic block diagram of an hydraulic fluid supply and control system for use with the present invention. An hydraulic fluid reservoir 63 is connected to a fluid supply line 64 below the fluid level in the reservoir 63. The fluid supply line 64 is connected to an inlet of an hydraulic pump 65 of the unidirectional, fixed displacement type. An outlet of the hydraulic pump 65 is connected to a system supply line 66. The outlet of the pump 65 is also connected through an adjustable pressure relief valve 67 to a return line 68 which terminates in the reservoir 63.

An accumulator 69 is connected to the system supply line 66. This accumulator serves as a reservoir of hydraulic fluid under pressure to prevent frequent on/off cycling of the pump 65. A pressure-sensitive switch 70 controls the operation of the pump 65. The limits of switch 70 are set to obtain the desired hydraulic fluid pressure in supply line 66 and accumulator 69.

The supply line 66 is connected to one inlet of a three-way normally closed solenoid actuated valve 71. An outlet of the valve 71 is connected by a return line 72 to the reservoir 63. An inlet/outlet of the valve 71 is connected by a line 73 to the threaded inlet 54 on the manifold 53. The hydraulic fluid exits from the manifold 53 into the passageway 52 and from there into the piston chamber 51 to actuate the piston 50 which in turn actuates the clutch assembly 45. Any fluid which passes the lip seals 56 of the primary seal is trapped by the secondary O-ring seals 60 and exits the manifold 53 through the threaded outlet 57. A return line 74 is connected to the threaded outlet 57 and terminates at the reservoir 63.

When the valve 71 is actuated, pressured fluid in the line 66 passes through the valve to the line 73 and flows to the piston chamber through the path described above. The clutch actuating fluid pressure is released when the energizing power is removed from the solenoid associated with the valve 71.

Hydraulic fluid in the piston chamber 51 can now flow backward through the fluid passageway 52, through the manifold 53, line 73, valve 71, and return line 72 to the reservoir 63. The release of pressure in piston chamber 51 reduces the force on piston 50 to essentially zero, allowing the plates in clutch pack 45 to rotate freely against each other. Thus, when the solenoid valve 71 is not energized, the differential behaves essentially as an open or free differential.

As the piston 50 is actuated by the application of pressured hydraulic fluid, the clutch disks 46 and 47 are squeezed together against the pressure plate thereby providing resistance to relative rotation between the left half axle 22 and the right half axle 23. Thus, the differential will be locked for a range of torque which is the difference in the torques applied to the half axles. The torque range will be from zero to an upper limit determined by the torque at which the clutch slips. This upper limit is related to the hydraulic fluid pressure.

In this embodiment of the hydraulic supply, the degree of locking is set by the limits set on pressure switch 70. The solenoid valve 71 could be controlled by an electronic circuit, not shown, that activates valve 71 when wheel spin occurs. It should be realized that other embodiments of the hydraulic supply are possible within the scope of this invention. For example, if the solenoid valve 71 were replaced by an electro-hydraulic proportional or servo valve, it would be possible to electronically vary the pressure in line 73 from zero to the value of pressure in line 66, as set by switch 70. This would permit the locking torque of the differential to be varied as necessary to meet driving requirements.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A variable lock vehicle differential apparatus for driving a pair of vehicle half axles from a drive shaft, comprising:

an outer housing;
a differential gear assembly in a case rotatably mounted in said housing and adapted to be coupled between a vehicle drive shaft and a pair of vehicle half axles, said differential gear assembly including a sun gear coupled to one of said half axles and an annular gear attached to said case and coupled to a planetary gear assembly mounted in said case and having a first plurality of planet gears each coupled for rotation by said case, a second plurality of planet gears each coupled for rotation by an associated one of said first plurality of planet gears and coupled to rotate said sun gear, and a hub portion coupled to the other one of said half axles, said sun gear and said annular gear rotating relative to one another during relative rotation between said half axles;

a clutch assembly coupled between said case and said sun gear for selectively resisting relative rotation between said case and said sun gear upon actuation;

actuating means for selectively hydraulically actuating said clutch assembly; and a manifold for supplying hydraulic fluid to said actuating means, said manifold mounted inside said outer housing and having an annular body for rotatably accepting said case, said manifold adapted to be connected to a source of hydraulic fluid under pressure, said manifold having an inwardly facing annular channel formed therein and an inlet formed in said annular body and in fluid communication with said channel, said channel being in fluid communication with said actuating means, a pair of lip seals positioned on opposite sides of said channel and sealingly engaging an outer surface of said case to function as a primary seal, a pair of O-ring seals retained in grooves formed in said annular body and positioned outwardly of said lip seals to function as a secondary seal sealingly engaging said outer surface of said case and an outlet formed in said annular body and in fluid communication with an inwardly facing surface of said manifold positioned between said lip seals and said O-ring seals whereby fluid in said channel which leaks past said lip seals flows to said outlet.

2. The apparatus according to claim 1 wherein said actuating means includes an annular piston mounted in a cylinder formed in said case and coupled to said clutch assembly and a passageway formed in said case for fluid communication between said manifold and said cylinder whereby pressured fluid flows from said manifold through said passageway and into said cylinder to actuate said piston and said clutch assembly and relative rotation between the half axles is prevented.

3. The apparatus according to claim 1 wherein said clutch assembly includes a plurality of alternate disks slidingly coupled to said case and each positioned between an adjacent pair of a plurality of intermediate disks slidingly coupled to said sun gear.

4. The apparatus according to claim 3 wherein said clutch assembly includes an annular pressure plate positioned at an opposite end of said disks from said actuating means and a snap ring engaging a groove formed in said case and abutting said pressure plate.

5. In a differential apparatus for driving a pair of vehicle half axles including an outer housing, a gear case rotatably mounted in the housing, a ring gear attached to the gear case and adapted to be rotated by a vehicle drive shaft, a differential gear assembly mounted in and coupled to the gear case and adapted to be coupled to a half axle and including a sun gear adapted to be coupled to another half axle, and means for preventing relative rotation between the gear case and the sun gear comprising:

a clutch assembly coupled between the gear case and the sun gear;

an hydraulically operated clutch actuating means coupled to said clutch assembly; and an hydraulic fluid manifold in fluid communication with said actuating means, said manifold mounted in the housing and sealed against an outer surface of the gear case, said manifold being formed with an annular body having an inwardly facing annular channel formed in an inner wall thereof and an inlet in fluid communication between said annular channel and an exterior surface of said manifold, said inlet adapted to be connected to a source of pressured hydraulic fluid, a primary seal having a pair of annular lip seals positioned on opposite sides of said channel for sealingly engaging an outer surface of the gear case, a secondary seal having a pair of O-ring seals retained in annular grooves formed between said channel and sides of said annular body for blocking the flow of any hydraulic fluid which leaks from said channel past said lip seals, an outlet formed in said exterior surface of said annular body, and a pair of passages formed in said annular body in fluid communication between said outlet and said inner wall of said annular body between said primary seal and said secondary seal.

6. The means for preventing relative rotation according to claim 5 wherein said clutch assembly includes a plurality of clutch disks stacked between a pressure plate and said actuating means, at least one of said disks slidingly coupled to the gear case and at least another one of said disks slidingly coupled to said sun gear and abutting said one disk, said pressure plate being coupled to the gear case.

7. The means for preventing relative rotation according to claim 5 wherein said actuating means includes an annular piston axially movable in a cylinder formed in the gear case and a passageway formed in the gear case in fluid communication between said cylinder and said manifold.

8. A variable lock differential apparatus for driving a pair of vehicle half axles from a drive shaft, comprising:

an outer housing;

a gear case and attached ring gear adapted to be coupled to and rotated by a vehicle drive shaft;

a planetary gear assembly mounted in said gear case and having a first plurality of planet gears each coupled for rotation by said case, a second plurality of planet gears each coupled for rotation by an associated one of said first plurality of planet gears, and a hub portion adapted to coupled to rotate a first half axle;

a sun gear coupled for rotation by said second plurality of planet gears and adapted to be coupled to rotate a second half axle;

a clutch assembly coupled between said gear case and said sun gear;

a piston retained in a cylinder formed in said gear case and coupled to said clutch assembly; and means for supplying fluid under pressure to said cylinder to actuate said piston and said clutch for resisting relative rotation between said gear case and said sun gear, said means for supplying fluid including an annular manifold fixedly mounted in said outer housing and including an inwardly facing annular channel, a primary seal for sealingly engaging an outer surface of said gear case, an inlet in fluid communication between said channel and an exterior surface of said manifold and adapted to be connected to a source of fluid under pressure whereby relative rotation between the half axles is prevented in a predetermined range of torque which is the difference in the torques applied to the half axles and is related to the pressure of the fluid supplied, a secondary seal for sealingly engaging said exterior surface of said gear case, said secondary seal positioned between said primary seal and a side surface of said manifold, and an outlet formed in said manifold and in fluid communication between said exterior surface of said manifold and a portion of said manifold between said primary seal and said secondary seal for removing fluid which leaks from said channel past said primary seal.

* * * * *